No. 636,591. Patented Nov. 7, 1899.
W. H. TUOHY.
FISH HOOK GUARD.
(Application filed Feb. 7, 1898.)

(No Model.)

Witnesses:
Geo. W. Young.
Chas. L. Goss.

Inventor:
William H. Tuohy,
By Winter Howden Smith Bothwin Wiles
Attorneys.

UNITED STATES PATENT OFFICE.

WILLIAM H. TUOHY, OF EAGLE, WISCONSIN.

FISHHOOK-GUARD.

SPECIFICATION forming part of Letters Patent No. 636,591, dated November 7, 1899.

Application filed February 7, 1898. Serial No. 669,348. (No model.)

*To all whom it may concern:*

Be it known that I, WILLIAM H. TUOHY, a citizen of the United States, residing at Eagle, in the county of Waukesha and State of Wisconsin, have invented certain new and useful Improvements in Fishhook-Guards, of which the following is a specification, reference being had to the accompanying drawings, forming a part thereof.

The object of my invention is to prevent a fishhook from catching on weeds, snags, or other obstructions without interfering with the effective operation of the hook.

It consists in certain novel features of construction and arrangement of parts, as hereinafter particularly described, and pointed out in the claims.

In the accompanying drawings like letters designate the same parts in the several figures.

Figure 3:
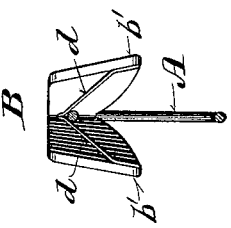
Figure 4:
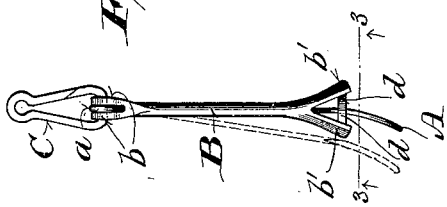
Figure 1:
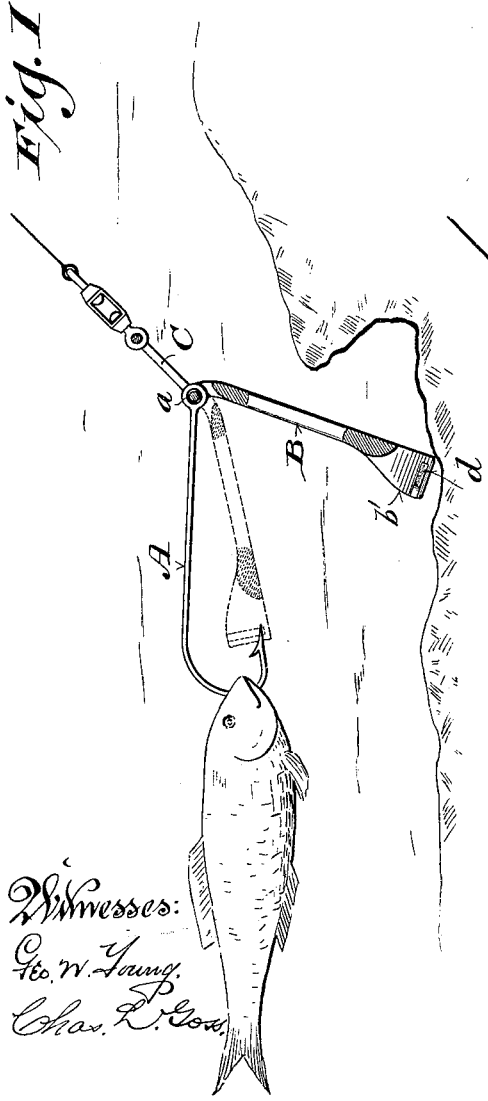
Figure 2:
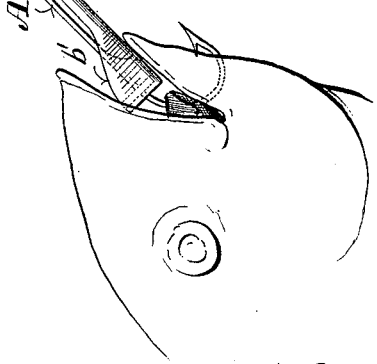

Figure 1 is a longitudinal section of the guard shown in connection with a hook in the position it normally has with reference to the hook when in use. Fig. 2 is a side elevation of the hook and guard, illustrating the operation of the device when it is closed against the hook and grasped by a fish. Fig. 3 is an end view of the guard and a cross-section of the hook on the line 3 3, Fig. 4; and Fig. 4 is an inverted plan view of the hook and guard.

A designates an ordinary fishhook formed with an eye or ring $a$ at the end of its shank, by which it is pivoted, with the guard B, on a wire snap-loop C. The guard is preferably made of sheet metal folded or bent longitudinally into the form shown. It is formed at one end with two perforated ears $b$, by which it is pivoted with the hook on the snap-loop C and between which the eye $a$ of the hook is held. At its other free end it is forked and formed into two longitudinally and upwardly diverging wings $b'$ $b'$, which are adapted to pass on opposite sides of the point of the hook when the guard is turned upwardly by engagement with a snag or other obstruction, as indicated by dotted lines in Fig. 1. To the wings $b'$ $b'$, at or near their upper edges, are attached two light springs $d$ $d$, which converge downwardly and meet each other, so as to form a yielding support for the point of the hook, as shown in Figs. 3 and 4. In case the hook is grasped by a fish when the guard is in the position shown in Figs. 3 and 4 and indicated by dotted lines in Fig. 1, the springs $d$ will be pressed by the point and the guard will close against the shank of the hook, as shown in Fig. 2, thus exposing the point of the hook and allowing it to engage with the fish as if the guard were not present. The springs $d$ are of sufficient strength to support the hook when the guard is closed over its point, as indicated by dotted lines in Fig. 1, and prevent it from catching on weeds, snags, or other obstructions.

Ordinarily the guard hangs in a substantially vertical position, as shown in Fig. 1, leaving the hook and its point completely exposed and holding it in a vertical plane—the most effective position for catching fish; but whenever it encounters an obstruction it is turned upwardly into the position indicated by dotted lines in Fig. 1, in which it protects the point and prevents it from catching on the obstruction. As soon as the obstruction is passed the guard drops again into an approximately vertical position.

The guard can be readily removed from the snap-loop C for substituting a new hook or for any other purpose. Whenever the guard has been pressed upwardly past the point of the hook, it is reset by bending the hook to one side, as indicated by dotted lines in Fig. 4, and carrying the point of the hook outside of the guard into its normal position with relation thereto.

I do not wish to be understood as limiting myself to the exact details shown and described, as they may be modified more or less within the intended scope of my invention—as, for example, in place of the two converging springs $d$ any other form or arrangement by which a yielding support for the point of the hook is afforded might be substituted.

I claim—

1. A fishhook-guard adapted to be pivotally connected at one end with the hook and to hang loosely therefrom, leaving the point of the hook normally exposed, and provided at or near its opposite end with a yielding support for the point of the hook, whereby the hook is prevented from catching on obstructions, but is allowed to pass said support into an exposed position when the guard is pressed toward the shank of the hook, substantially as and for the purposes set forth.

2. A guard having means for pivotally connecting it with a fishhook and allowing it to swing toward and from the shank past the point of the hook, and a spring-support adapted to yieldingly hold the guard over the point of the hook in position to protect the same in passing obstructions and to allow the guard to pass inwardly by and expose the point when the hook and guard are grasped and pressed toward each other, the guard being adapted to hang normally loosely suspended from the shank of the hook and to hold the hook exposed in a vertical plane, substantially as and for the purposes set forth.

3. A fishhook-guard provided with means for pivotally connecting it at one end with the hook, forked at the opposite end to pass on opposite sides of and protect the point of the hook, and provided with two converging springs which afford a yielding support for the point of the hook, but allow it to pass the guard into an exposed position when the guard is forcibly pressed toward the shank of the hook, substantially as and for the purposes set forth.

In witness whereof I hereto affix my signature in presence of two witnesses.

WM. H. TUOHY.

Witnesses:
LANSING E. HALL,
ED. J. LINS.